United States Patent
Allen

(10) Patent No.: US 7,337,340 B2
(45) Date of Patent: Feb. 26, 2008

(54) SYSTEM AND METHOD OF COMPENSATING FOR THE EFFECTS OF ON-CHIP PROCESSING VARIATION ON AN INTEGRATED CIRCUIT

(75) Inventor: David Howard Allen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 11/082,927

(22) Filed: Mar. 17, 2005

(65) Prior Publication Data

US 2006/0212735 A1    Sep. 21, 2006

(51) Int. Cl.
*G06F 1/00* (2006.01)
*G06F 1/26* (2006.01)

(52) U.S. Cl. .................. 713/322; 713/300; 713/320

(58) Field of Classification Search .......... 713/322
See application file for complete search history.

(56) References Cited

U.S. PATENT DOCUMENTS

2006/0156045 A1* 7/2006 Galles .................. 713/300

* cited by examiner

*Primary Examiner*—James K. Trusillo
*Assistant Examiner*—Stefan Stoynov
(74) *Attorney, Agent, or Firm*—Dillon & Yudell LLP

(57) ABSTRACT

A system and method of compensating for effects of on-chip processing variation on an integrated circuit. The integrated circuit is divided into a set of regions. Then, a region control logic, included in each region, predicts a processing variation in each respective region of the integrated circuit. Finally, each region control logic automatically selects one of a set of available power settings to power each one of the respective regions, in response to the region control logic predicting the processing variation, wherein the processing variation of each of the set of regions is minimized.

12 Claims, 6 Drawing Sheets

SYSTEM AND METHOD OF COMPENSATING FOR THE EFFECTS OF ON-CHIP PROCESSING VARIATION ON AN INTEGRATED CIRCUIT

BACKGROUND OF THE INVENTION

1. Technical Field

The present invention relates in general to integrated circuits. More particularly, the present invention relates to providing power to integrated circuits. Still more particularly, the present invention relates to a system and method of compensating for effects of on-chip processing variation on an integrated circuit.

2. Description of the Related Art

As integrated circuits increase in size and complexity, improvements in lithography have led to smaller device dimensions and interconnect pitches. The reduction of device dimensions and interconnect pitches contribute to increased relative variation in processing across each integrated circuit. Several properties such as effective channel length, gate oxide thickness, threshold voltages, and other device parameters vary over a single integrated circuit. These device parameter variations affect device characteristics, which contribute to variations in operating frequency and power dissipation across the integrated circuit.

FIG. 2 is a pictorial representation of on-chip processing variation across a critical path on an integrated circuit 200 according to the prior art. Included in integrated circuit 200 are exemplary circuits 208a-208e. Circuits 208a-208e, coupled by interconnect 210, form a path across integrated circuit 200. Also, as illustrated in FIG. 2, regions 202, 204, and 206 define regions on integrated circuit 200 where the processing in those regions are characterized as "slow", "nominal", and "fast", respectively. Those with skill in this art will appreciate that regions with processing characterized as "slow" typically limit the frequency in which a signal may propagate through the region. An integrated circuit designer can remedy this problem by increasing the supply voltage. Consequently, regions with processing characterized as "fast" typically operate at a higher frequency at the same voltage setting as a "slow" region. The "fast" regions of an integrated circuit contribute to DC leakage currents. As well-known to those with skill in this art, integrated circuit 200 is typically coupled to a single power supply (not illustrated in FIG. 2). The region with processing characterized as "slow" limits the cycle time and the maximum operating frequency of integrated circuit 200. Likewise, the region with processing characterized as "fast" contribute to power consumption or dissipation through DC leakage currents. If a designer utilizes integrated circuit 200 in a power-sensitive application, raising the supply voltage often requires the designer to lower the operating frequency to reduce the power dissipation effects of "fast" regions. Therefore, there is a need for a system and method of minimizing differences in frequency and power dissipation across various regions of an integrated circuit.

SUMMARY OF THE INVENTION

A system and method of compensating for effects of on-chip processing variation on an integrated circuit is disclosed. The integrated circuit is divided into a set of regions. Then, region control logic, included in each region, predicts a processing variation in each respective region of the integrated circuit. Finally, each region control logic automatically selects one of a set of available power settings to power each one of the respective regions, in response to the region control logic predicting the processing variation, wherein the processing variations of each of the set of regions are minimized.

The above as well as additional objects, features, and advantages of the present invention will become apparent in the following detailed written description.

BRIEF DESCRIPTION OF THE FIGURES.

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

The present invention provides a method and an integrated circuit design/configuration by which effects of on-chip property variations can be minimized. On-chip property variations affect both the frequency and power dissipation characteristics of various regions of an integrated circuit. The present invention enables dynamic analysis of the integrated circuit and varies the voltage setting of a power supply utilized by specific regions of the integrated circuit, depending on the results of an analysis of the signal propagation of the region. The present invention also enables power distribution within each of the various regions which is physically and electrically separate from other regions in the integrated circuit.

Figure 1:
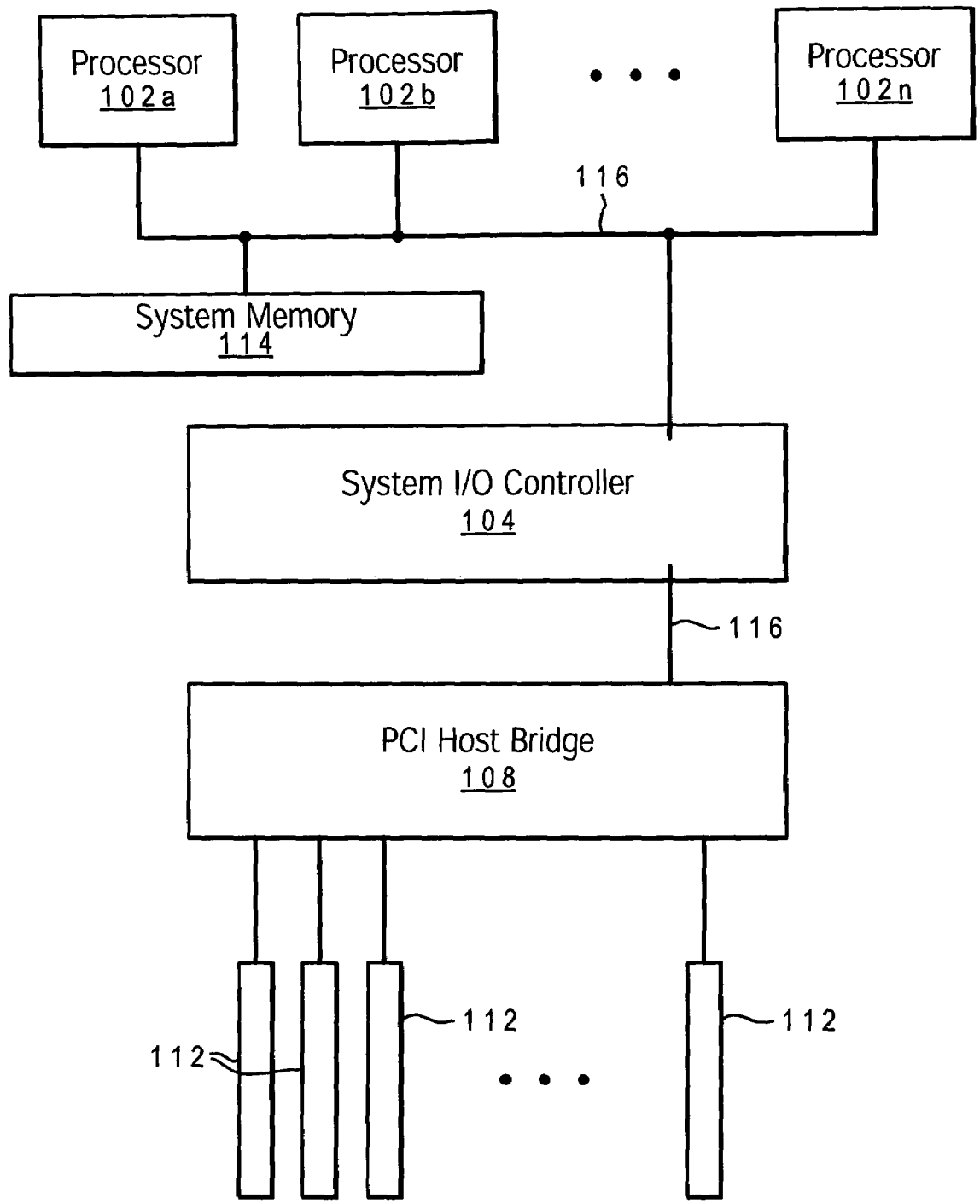
FIG. 1 is a block diagram illustrating an exemplary data processing system in which a preferred embodiment of the present invention may be implemented.
Figure 2:
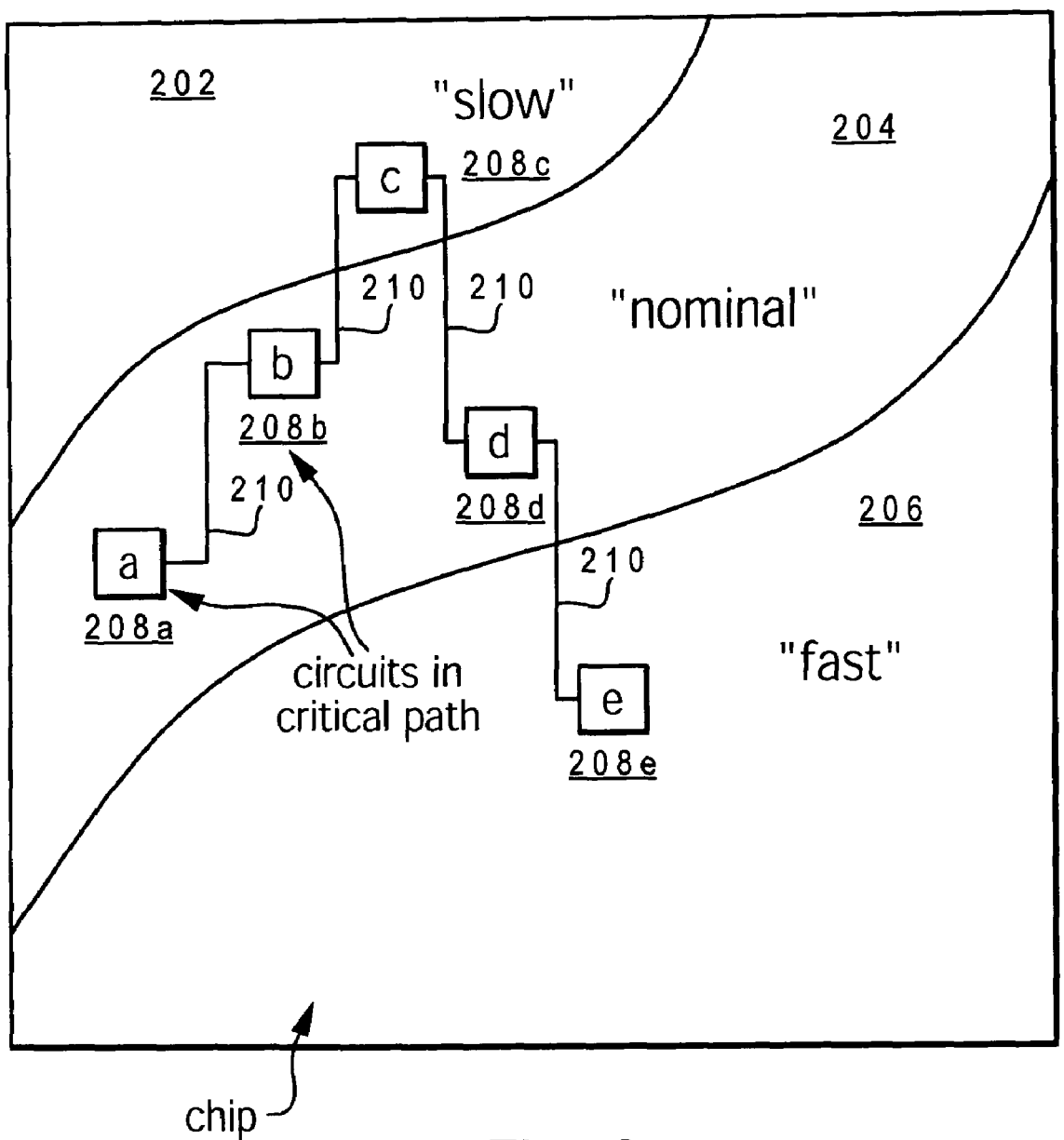
FIG. 2 is a pictorial representation of on-chip processing variation across a critical path on an integrated circuit according to the prior art.

With reference now to the figures and in particular, with reference to FIG. 1, there is depicted an exemplary data processing system 100 in which a preferred embodiment of the present invention may be implemented. As illustrated, a collection of processors 102a to 102n are coupled to system memory 114 via an interconnect 116. Processors 102a to 102n are exemplary integrated circuits in which a preferred embodiment of the present invention may be implemented. System memory 114 is preferably implanted as a dynamic random access memory (DRAM) module, but those skilled in this art will appreciate that system memory 114 may alternatively be implemented as a hard disk, optical drive, or flash memory. Data processing system 100 preferably supports a variety of input/output (I/O) components, such as one conforming to Industry Standard Architecture (ISA), Advanced Graphics Port (AGP), and Peripheral Component Interconnect (PCI) standards, via a system I/O controller 104. Also, mezzanine bus 118 couples PCI host bridge 108 to system I/O controller 104. Coupled to PCI host bridge 108 are a variety of PCI adapters 112, which may be implemented as audio cards, network interface cards (NIC), modems, or any other PCI components.

Those skilled in this art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the system and method for mitigating the effects of on-chip processing variation in frequency and power dissipation provided by the present invention are applicable to data processing systems of any system architecture and are in no way limited to the generalized multi-processing (MP) architecture or symmetric multi-processor (SMP) system structure illustrated in FIG. 1.

Figure 3:
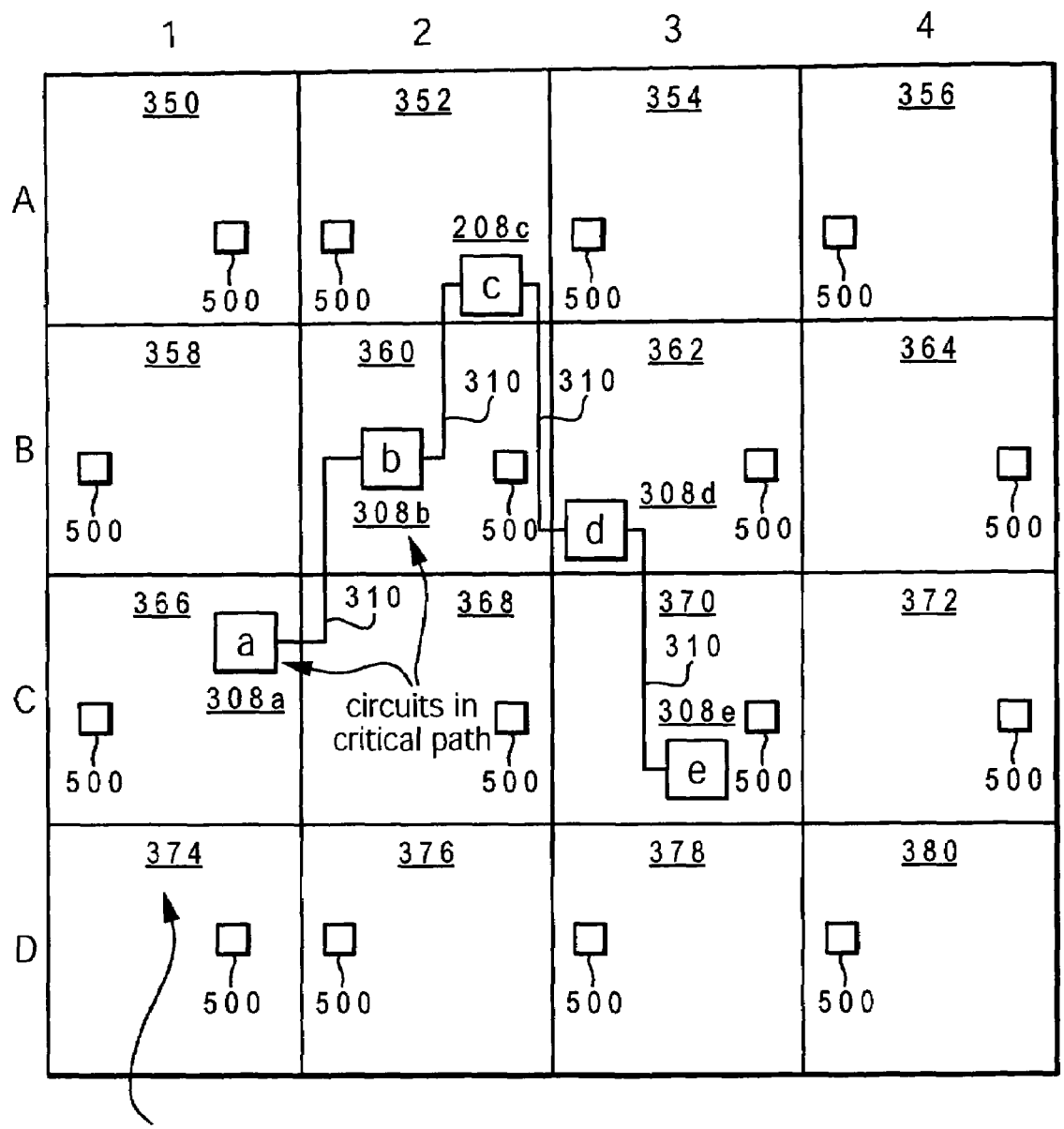
FIG. 3 is a block diagram illustrating a method of dividing an integrated circuit into various regions according to a preferred embodiment of the present invention.

FIG. 3 is a pictorial representation of the distribution of circuits among a set of defined regions on an integrated circuit according to a preferred embodiment of the present invention. Integrated circuit 300 includes circuits 308a-308e, each coupled to another circuit via interconnect 310. Integrated circuit 300 is also divided into regions 350-380. According to a preferred embodiment of the present invention, each region 350-380 includes a respective region control logic 500. Each region control logic 500 measures the signal propagation frequency in its respective region and sends the measured signal propagation frequency to central control logic 410 via data bus 406, both discussed herein in more detail in conjunction with FIG. 4. Those with skill in this art will appreciate that the signal propagation frequency of each region may be measured with a qualitative label, such as "fast", "nominal", or "slow". Other ways of characterizing the signal propagation frequency of each region may involve assigning a value to each region where "0" is nominal and any integer (e.g., 1, −1, 2, 4, −6) determines which power setting the specific region should select in optimizing the design.

Figure 4:
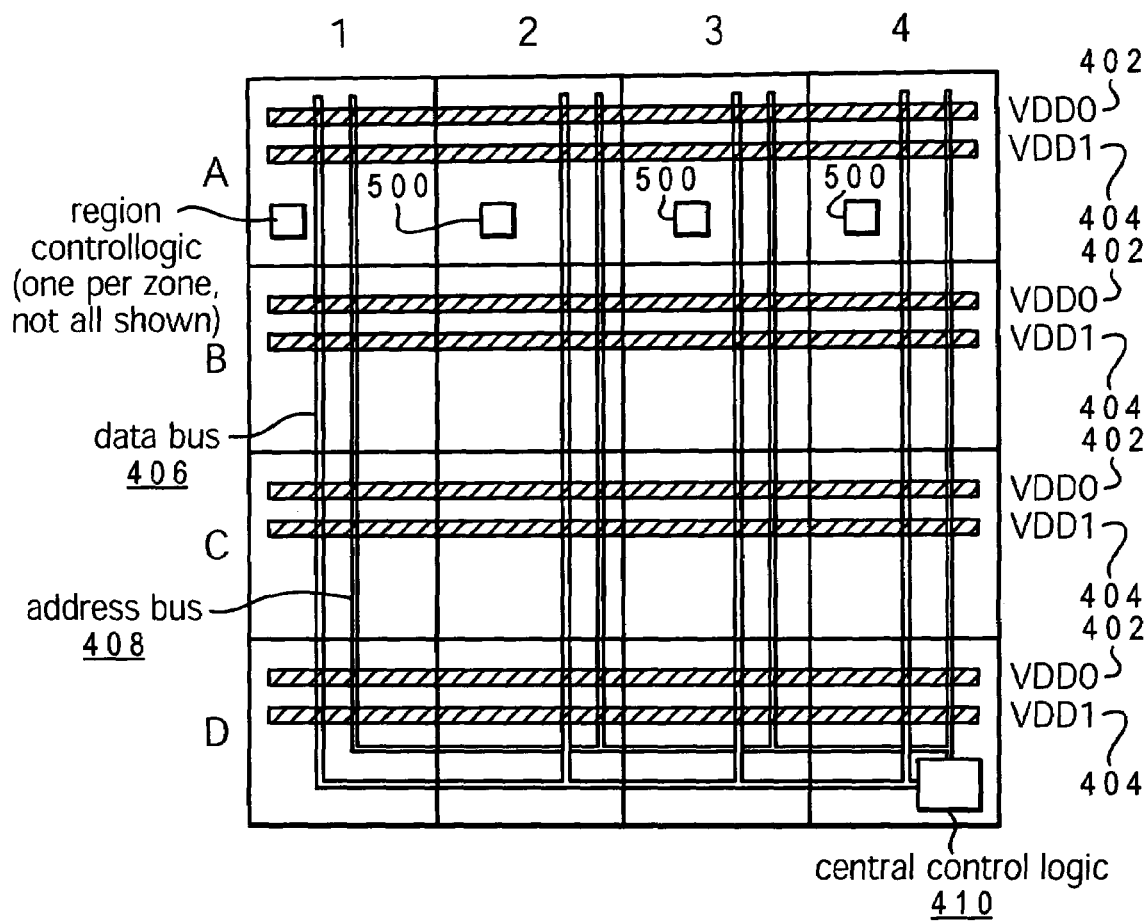
FIG. 4 is a block diagram depicting an exemplary integrated circuit in which a preferred embodiment of the present invention may be implemented.

FIG. 4 illustrates a second representation of an exemplary integrated circuit in which a preferred embodiment of the present invention may be implemented. FIG. 4 depicts VDD0 lines 402 and VDD1 lines 404, which are two power supplies available for powering each region 350-380. As illustrated, integrated circuit 300 also includes data bus 406 and address bus 408, which enable communication between central control logic 410 and each region control logic 500. Central control logic 410 collects the signal propagation frequency measurements from each region control logic 500 and selects from a set of available voltage settings for assignment to each region 350-380.

As discussed later in more detail in conjunction with FIG. 5, the interaction between central control logic 410 and each region control logic 500 is dynamic. During operation, central control logic 410 and each region control logic 500 constantly measure the signal propagation frequency of each region and adjust the assignment of voltage settings as needed.

Figure 5:
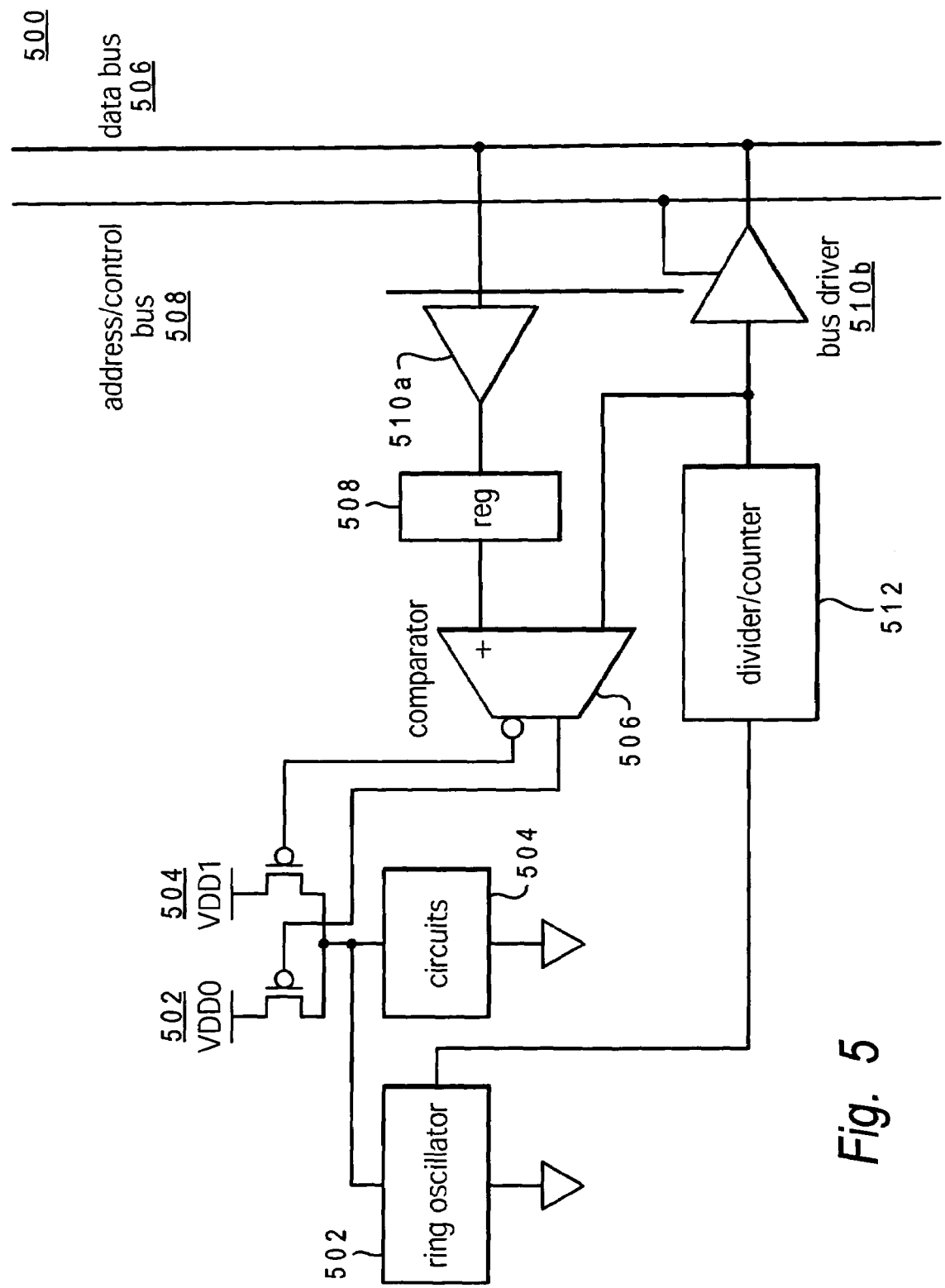
FIG. 5 is a circuit diagram illustrating a region control logic unit in which a preferred embodiment of the present invention may be implemented.

With reference now to FIG. 5, there is depicted a circuit diagram of region control logic 500 according to a preferred embodiment of the present invention. As described above, region control logic 500 measures the signal propagation frequency of the respective region, as indicated by circuits 504, by comparing the measured signal propagation frequency with a default signal propagation frequency sent by central control logic 410. The result of the comparison enables region control logic 500 to select an appropriate supply voltage from a set of available voltage settings. While FIG. 5 depicts an available selection of two supply voltages (VDD0 402 and VDD1 404), another embodiment of the present invention may include more than two available input voltages. Still another embodiment of the present invention may replace the multiple supply voltage sources with a single voltage source that includes a "soft switch" that operates as a programmable voltage supply. Each region can step up or step down the provided voltage according to the results of comparator 408.

As depicted, a ring oscillator 502, utilized as a performance monitor, to predict the processing variation in the respective region. Divider/counter 512 measures the frequency of ring oscillator 502. Bus drivers 510a and 510b are circuits added to address/control bus 510a and data bus 510b to facilitate sufficient drive of a signal to central control logic 410. Bus drivers 510a and 510b are necessary to combat capacitive loading, which slows down the data propagation rate and prevents proper time sequencing of system operation.

As illustrated, central control logic 410 sends a default signal propagation frequency via data bus 406. A register 508 stores the default signal propagation frequency value sent by central control logic 410. When divider/counter 512 predicts the processing variation (e.g., the signal propagation frequency) of the particular region, a comparator 506 compares the actual signal propagation frequency of the region with the default signal propagation frequency stored in register 508. Alternatively, central control logic 410 can collect all of the measured ring oscillator frequencies (e.g., signal propagation frequency) from all the regions and then sends a default signal propagation frequency calculated from the collection of measured ring oscillator frequencies.

Figure 6:
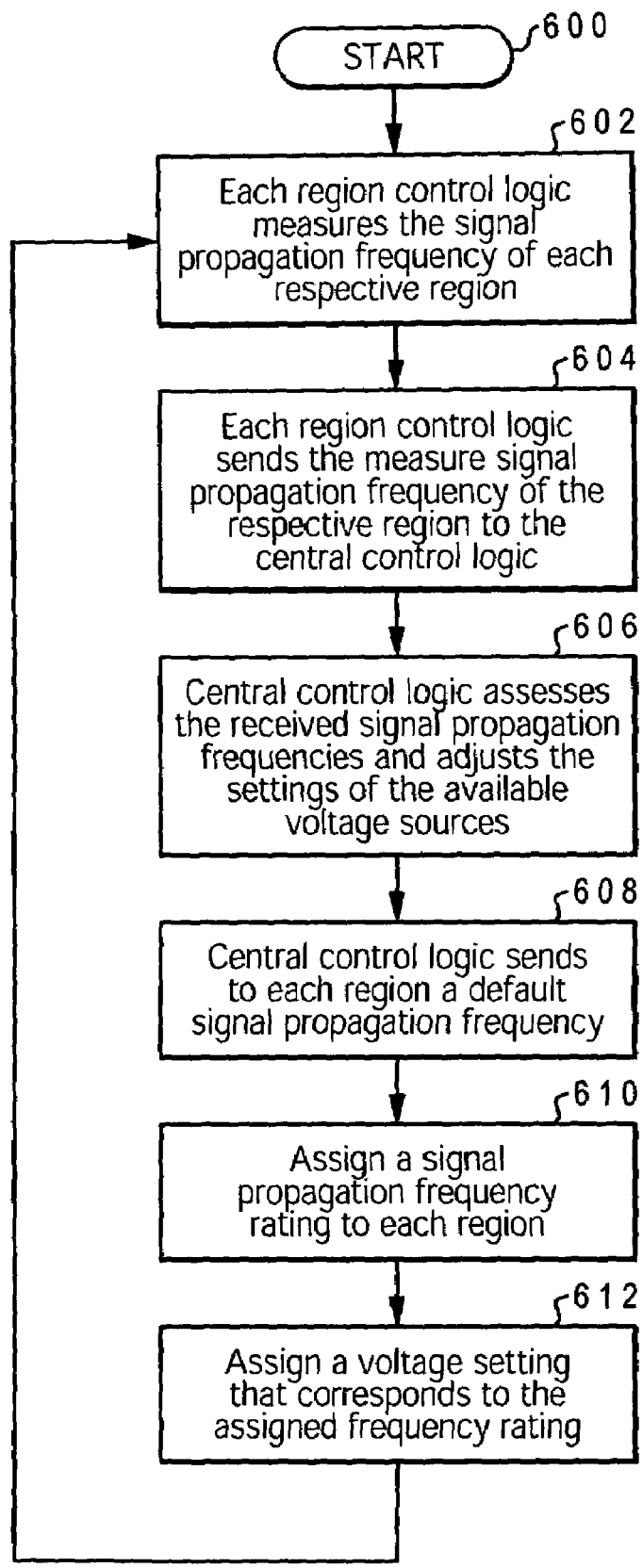
FIG. 6 is a high-level logical flowchart depicting a method of compensating for effects of on-chip property variations according to a preferred embodiment of the present invention.

FIG. 6 is a high-level logical flowchart depicting a method of compensating for on-chip processing variations according to a preferred embodiment of the present invention. As illustrated, the process begins at step 600 and proceeds to step 602, which depicts each region control logic 500 measuring the signal propagation frequency of each respective region. As previously discussed, ring oscillator 502 and divider counter 512 measure the signal propagation frequency of circuits 504. The process then continues to step 604, which depicts each region control logic 500 sending the measure of signal propagation frequency of the respective region to central control logic 410. Region control logic 500 sends the signal propagation frequency for the respective region via address/control bus 408.

The process then continues to step 606, which illustrates central control logic 410 assessing the received signal propagation frequencies from each respective region and adjusts the settings of the available voltage sources. In one embodiment of the present invention, central control logic 410 can adjust the voltage settings of the voltages sources VDD0 402 and VDD1 404 in response to the received data from each respective region. Those with skill in this art will appreciate that integrated circuit 300 may include any number of voltage sources and is not limited to the two sources (e.g., VDD0 402 and VDD1 404) as depicted in FIG. 5. In another embodiment of the present invention, VDD0 402 and VDD1 404 may be replaced with a single voltage source with the capacity of providing a special voltage setting for each region of integrated circuit 300 via voltage step-up or step-down circuitry.

The process then continues to step 608, which depicts central control logic 410 sending to each region a default signal propagation frequency. Central control logic 410 determines the value of the default signal propagation frequency such that the regions with lower ring oscillator frequency measurements can be compensated with a higher voltage supply and the regions with higher ring oscillator frequencies (e.g., signal propagation) can be compensated with a lower voltage supply.

The process continues to step 610, which illustrates each region control logic 500 assigning a signal propagation frequency rating to each respective region. As previously discussed, the signal propagation frequency rating of each region may be measured with a qualitative label, such as "fast", "nominal", or "slow". Other ways of characterizing the signal propagation frequency rating of each region involves assigning a value to each region where "0" is nominal and any integer (e.g., 1, −1, 2, 4, −6) determines which power setting the specific region should select in optimizing the design.

The process then proceeds to step 612, which depicts each region control logic 500 assigning a voltage setting to each respective region that corresponds to the assigned signal propagation frequency rating. As previously discussed, comparator 506 in region control logic 500 compares the signal from data bus 406 (i.e., the default signal propagation frequency) to the signal from divider/counter 512 (i.e., the measured signal propagation frequency) and assigns a voltage setting depending on the result of the comparison. As depicted in FIG. 5, if the measured signal propagation frequency is greater than the default signal propagation frequency, comparator 506 will select the lower voltage setting. Likewise, if the measured signal propagation frequency is less than the default signal propagation frequency, comparator 506 will select the higher voltage setting. In another embodiment of the present invention, there may be more than two available voltage settings. Comparator 506 may be replaced by a selection circuit such as a multiplexer that can choose from multiple (e.g., more than two) voltage sources. The process then returns to step 602 and proceeds in an iterative fashion.

As disclosed, the present invention is a system and method of compensating for effects of on-chip processing variation on an integrated circuit. The integrated circuit is divided into a set of regions. Then, region control logic, included in each region, predicts a processing variation in each respective region of the integrated circuit. Finally, each region control logic automatically selects one of a set of available power settings to power each one of the respective regions, in response to the region control logic predicting the processing variation, wherein the processing variation of each of the set of regions is minimized.

While this invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of such signal-bearing media include, without limitation, recordable-type media such as floppy disks or CD-ROMs and transmission-type media such as analog or digital communication links.

What is claimed is:

1. A method for compensating for effects of on-chip processing variation on an integrated circuit, comprising:
    dividing an integrated circuit into a plurality of regions;
    dynamically predicting a processing variation of said plurality of regions, wherein said processing variation of said plurality of regions comprises differences in processing frequency and power dissipation contributed by variations in fabrication processes utilized during manufacturing of said integrated circuit; and
    automatically selecting one of a plurality of available power settings to power said plurality of regions, in response to said predicting, wherein said processing variation between said plurality of regions is minimized.

2. The method in claim 1, wherein said dynamically predicting further includes:
    measuring at least one signal propagation frequency of said plurality of regions.

3. The method in claim 2, wherein said automatically selecting further includes:
    sending said at least one signal propagation frequency to a central control logic;
    assessing said at least one signal propagation frequency;
    adjusting at least one of said plurality of available power settings;
    sending to said plurality of regions at least one signal rating;
    assigning said at least one of said plurality of available power settings corresponding to said at least one signal rating.

4. The method in claim 1, wherein said automatically selecting further comprises:
    automatically selecting said one of said plurality of available power settings to power said plurality of regions, wherein said processing variation between said plurality of regions is minimized to normalize an operating frequency between said plurality of regions.

5. The method in claim 1, wherein said plurality of available power settings are provided by a single voltage supply that includes a soft switch that operates as a programmable voltage supply.

6. The method in claim 1, wherein said automatically selecting further comprises:
    determining a value of a default signal propagation frequency such that regions among said plurality of regions with lower frequency ring oscillator measurements are compensated with a higher voltage supply and regions among said plurality of regions with higher frequency ring oscillator measurements are compensated with a lower voltage supply.

7. A computer program product for compensating for effects of on-chip processing variation on an integrated circuit, comprising:
    instructions, stored on a computer-readable medium, for dividing an integrated circuit into a plurality of regions;
    instructions, stored on a computer-readable medium, for dynamically predicting a processing variation of said plurality of regions, wherein said processing variation of said plurality of regions comprises differences in processing frequency and power dissipation contributed by variations in fabrication processes utilized during manufacturing of said integrated circuit; and
    instructions, stored on a computer-readable medium, for automatically selecting one of a plurality of available power settings to power said plurality of regions, in response to said instructions for predicting, wherein said processing variation between said plurality of regions is minimized.

8. The computer program product of claim 7, wherein said instructions for dynamically predicting further includes:
   instructions, stored on a computer-readable medium, for measuring at least one signal propagation frequency of said plurality of regions.

9. The computer program product of claim 8, wherein said instructions for automatically selecting further includes:
   instructions, stored on a computer-readable medium, for sending said at least one signal propagation frequency to a central control logic;
   instructions, stored on a computer-readable medium, for assessing said at least one signal propagation frequency;
   instructions, stored on a computer-readable medium, for adjusting at least one of said plurality of available power settings;
   instructions, stored on a computer-readable medium, for sending to said plurality of regions at least one signal rating; and
   instructions, stored on a computer-readable medium, for assigning at least one of said plurality of available power settings corresponding to said at least one signal rating.

10. The computer program product of claim 7, wherein said instructions for automatically selecting further includes:
    instructions, stored on a computer-readable medium, for automatically selecting one of said plurality of available power settings to power said plurality of regions, wherein said processing variation between said plurality of regions is minimized to normalize an operating frequency between said plurality of regions.

11. The computer program product of claim 7, wherein said plurality of available power settings are provided by a single voltage supply that includes a soft switch that operates as a programmable voltage supply.

12. The computer program product of claim 7, wherein said wherein said instructions for automatically selecting further includes:
    instructions, stored on a computer-readable medium, for determining a value of a default signal propagation frequency such that regions among said plurality of regions with lower frequency ring oscillator measurements are compensated with a higher voltage supply and regions among said plurality of regions with higher frequency ring oscillator measurements are compensated with a lower voltage supply.

* * * * *